US011278956B2

(12) United States Patent
Stensvad et al.

(10) Patent No.: US 11,278,956 B2
(45) Date of Patent: Mar. 22, 2022

(54) POWDER DEAGGLOMERATOR AND METHOD OF DEAGGLOMERATING A POWDER

(71) Applicant: 3M INNOVATIVE PROPERTIES COMPANY, St. Paul, MN (US)

(72) Inventors: Karl K. Stensvad, Inver Grover Heights, MN (US); James N. Dobbs, Woodbury, MN (US); Eric A. Vandre, Roseville, MN (US); Chrispian E. Shelton, Minneapolis, MN (US); Satinder K. Nayar, Woodbury, MN (US); Saurabh Batra, Minneapolis, MN (US); Samad Javid, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 361 days.

(21) Appl. No.: 16/499,096

(22) PCT Filed: Mar. 29, 2018

(86) PCT No.: PCT/US2018/025185
§ 371 (c)(1),
(2) Date: Sep. 27, 2019

(87) PCT Pub. No.: WO2018/191028
PCT Pub. Date: Oct. 18, 2018

(65) Prior Publication Data

US 2021/0086260 A1 Mar. 25, 2021

Related U.S. Application Data

(60) Provisional application No. 62/483,740, filed on Apr. 10, 2017.

(51) Int. Cl.
*B02C 19/18* (2006.01)
*B22F 1/00* (2022.01)
*C01B 32/21* (2017.01)

(52) U.S. Cl.
CPC ............ *B22F 1/0081* (2013.01); *B02C 19/18* (2013.01); *C01B 32/21* (2017.08); *B02C 2019/183* (2013.01); *B22F 2999/00* (2013.01)

(58) Field of Classification Search
CPC . B02C 19/18; B02C 19/068; B02C 2019/183; C01B 32/21
See application file for complete search history.

(56) References Cited

U.S. PATENT DOCUMENTS 2,980,345 A 4/1961 Kececioglu
3,003,707 A 10/1961 Lecher
(Continued)

FOREIGN PATENT DOCUMENTS

CN 1264322 A 8/2000
CN 201357106 9/2009
(Continued)

OTHER PUBLICATIONS

International Search Report for PCT International Application No. PCT/US2018/025185, dated Jun. 21, 2018, 5 pages.

*Primary Examiner* — Faye Francis
(74) *Attorney, Agent, or Firm* — Bradford B. Wright

(57) ABSTRACT

A powder deagglomerator includes a vertical flow chamber, a powder inlet tube, and an ultrasonic horn vibrationally coupled to an ultrasonic transducer. The vertical flow chamber includes an outer wall, powder outlet port, and a mounting port sealably engaging an ultrasonic horn. The powder inlet tube extends through the outer wall and is aligned to dispense agglomerated powder in a gaseous stream downward onto a distal end of the ultrasonic horn. A method of (Continued)

using the powder deagglomerator to deagglomerate a powder is also disclosed.

10 Claims, 4 Drawing Sheets

(56) References Cited

U.S. PATENT DOCUMENTS

| | | | |
|---|---|---|---|
| 4,156,593 A | 5/1979 | Tarpley, Jr. | |
| 5,716,751 A * | 2/1998 | Bertrand | B02C 19/068 |
| | | | 241/15 |
| 5,975,309 A | 11/1999 | Mitsuda | |
| 6,135,370 A | 10/2000 | Arnold | |
| 6,511,701 B1 | 1/2003 | Divigalpitiya | |
| 7,857,243 B2 | 12/2010 | Li | |
| 7,896,267 B2 | 3/2011 | Ishigaki | |
| 8,071,034 B2 | 12/2011 | de Broqueville | |
| 2003/0168538 A1* | 9/2003 | Dobson | G07F 13/10 |
| | | | 241/21 |
| 2005/0260106 A1* | 11/2005 | Marhasin | C22B 1/00 |
| | | | 422/128 |
| 2008/0197218 A1* | 8/2008 | Ishigaki | B02C 19/18 |
| | | | 241/5 |
| 2017/0233718 A1* | 8/2017 | Halaka | B02C 19/18 |
| | | | 241/1 |
| 2018/0072575 A1* | 3/2018 | Gulas | H01M 10/0525 |
| 2020/0206749 A1* | 7/2020 | Rothman | B03D 1/08 |
| 2020/0398284 A1* | 12/2020 | Chee | B02C 13/16 |

FOREIGN PATENT DOCUMENTS

| | | |
|---|---|---|
| CN | 105251592 | 1/2016 |
| FR | 2395071 | 1/1979 |
| JP | S6351958 | 3/1988 |
| JP | 2000263039 | 9/2000 |
| JP | 2003088773 | 3/2003 |
| SU | 1538929 A1 | 1/1990 |
| WO | WO 2018-191008 | 10/2018 |
| WO | WO 2019-025903 | 2/2019 |

* cited by examiner

POWDER DEAGGLOMERATOR AND METHOD OF DEAGGLOMERATING A POWDER

TECHNICAL FIELD

The present disclosure broadly relates to methods of deagglomerating agglomerated particles within a gaseous stream.

BACKGROUND

Powders dispensed by apparatuses such as gravity fed hoppers, screws, and the like often contain agglomerated particles made up of constituent particles loosely adhered to each other. The agglomerated particles may then persist in that form through subsequent processing operations and become incorporated into a final article, where they may not perform as well as the unagglomerated individual constituent particles. Agglomeration may result from factors such as, for example, humidity, compaction, and/or adhesive forces between particles. While many attempts have been made to solve this problem, there remains a need for methods and apparatus that can effectively deagglomerate agglomerated particles in a gaseous stream.

SUMMARY

The present disclosure overcomes this problem by providing a powder deagglomerator including an ultrasonic horn, which breaks up agglomerated particles.

In a first aspect, the present disclosure provides a powder deagglomerator comprising:
a vertical flow chamber having a longitudinal axis and comprising:
  an outer wall;
  a powder outlet port disposed at an upper end of the vertical flow chamber;
  a mounting port sealably engaging an ultrasonic horn disposed at a bottom end of the vertical flow chamber opposite the upper end;
  a powder inlet tube aligned to dispense agglomerated powder downward onto a distal end of the ultrasonic horn; and
an ultrasonic transducer vibrationally coupled to the ultrasonic horn.

In a second aspect, the present disclosure provides a method of deagglomerating a powder comprising agglomerated particles, the method comprising:
providing a powder deagglomerator comprising:
  a vertical flow chamber having a longitudinal axis and comprising:
    an outer wall;
    a powder outlet port disposed at an upper end of the vertical flow chamber;
    a mounting port sealably engaging an ultrasonic horn disposed at a lower end of the vertical flow chamber opposite the upper end;
  a powder inlet tube extending aligned to supply an agglomerated powder comprising agglomerated constituent particles entrained in a gaseous stream downward onto a distal end of the ultrasonic horn; and
  an ultrasonic transducer vibrationally coupled to the ultrasonic horn; and
introducing the agglomerated powder entrained in the gaseous stream into the powder inlet tube such that at least some of the agglomerated constituent particles contact the ultrasonic horn and are deagglomerated to provide unagglomerated constituent particles, whereby at least some of the unagglomerated constituent particles are entrained in the gaseous stream at the powder outlet port.

As used herein:
The term "powder" refers to particulate matter in a finely divided flowable state, and does not include particles that are dispersed in a liquid vehicle such as, for example, a slurry or dispersion;

"agglomerated particles" refers to a clustered and/or jumbled mass of constituent particles that are loosely adhered together;

"ultrasonic" refers vibrational frequencies in the range of 1 kilohertz to 1 megahertz (e.g., 10-80 kilohertz, or even 10-50 kilohertz; and "unagglomerated particles" refers to constituent particles that are not agglomerated and may be formed by breaking up agglomerated particles.

Features and advantages of the present disclosure will be further understood upon consideration of the detailed description as well as the appended claims.

Figure 1:
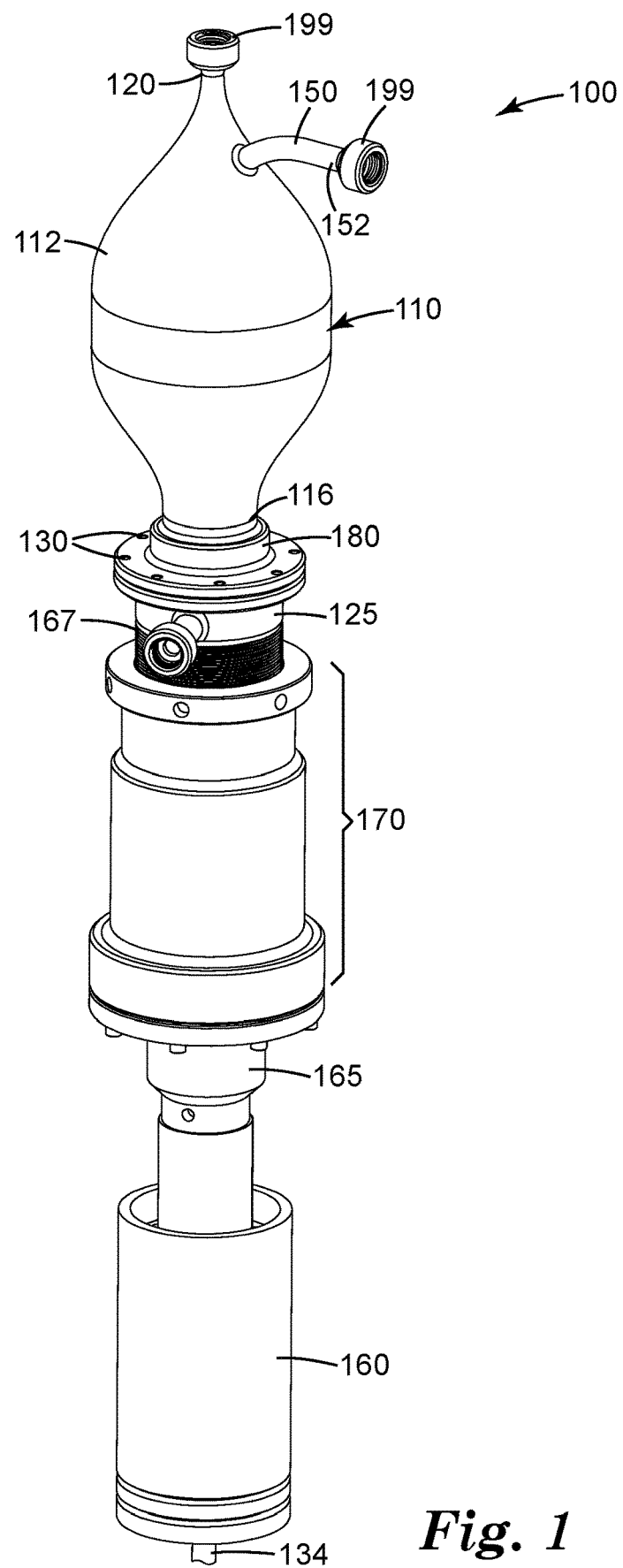
FIG. 1 is a schematic perspective view of an exemplary powder deagglomerator 100.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Referring now to FIGS. 1-4, powder deagglomerator 100 comprises hollow vertical flow chamber 110 which has longitudinal axis 118. Vertical flow chamber 110 comprises outer wall 112 with upper and lower ends 114, 116. Powder outlet port 120 is disposed at upper end 114. Mounting port 180 sealably engages ultrasonic horn 140 disposed at lower end 116 of vertical flow chamber 110. Optional pressure housing 125 is secured to the mounting port 180 such that the ultrasonic horn 140 extends within pressure housing 125. Tubular housing adapter 170 engages pressure housing 125 and booster 165.

End 152 of powder inlet tube 150 is disposed along longitudinal axis 118 of vertical flow chamber. Upper and lower ends of the vertical flow chamber 110 are inwardly tapered toward longitudinal axis. Ultrasonic horn 140 has a cylindrical distal end 142 vertically disposed within the vertical flow chamber 110. Powder inlet tube 150 extends through the outer wall 112 and is supported by optional support fins 113. Powder inlet tube 150 is aligned to dispense agglomerated powder in a gaseous stream downward onto distal end 142 of ultrasonic horn 140. Ultrasonic transducer 160 is vibrationally coupled to ultrasonic horn 140 via booster 165 which extends into optional pressure housing 125. In use, electrical power cord 134 supplies electrical energy to ultrasonic transducer 160 from a power supply (not shown).

When electronically driven by an ultrasonic generator the transducer provides ultrasonic vibration to the booster and ultimately the ultrasonic horn. Ultrasonic generators, transducers, boosters, and horns of many suitable configurations are widely commercially available. Selection of appropriate ultrasonic transducers and generators is within the capability of those skilled in the art. The ultrasonic horn is typically driven at a vibrational frequency of 1 kilohertz (kHz) to 1 megahertz (MHz), preferably 10 to 80 kHz, more preferably 10-50 kHz, and even more preferably 15-45 kHz, although other frequencies may also be used. Typically, the peak-to-peak displacement amplitude of the horn is in the range 0.25 microns to 7 mils (0.18 mm), preferably 1 micron to 3 mils (0.08 mm), although is not a requirement.

Figures 2, 3:
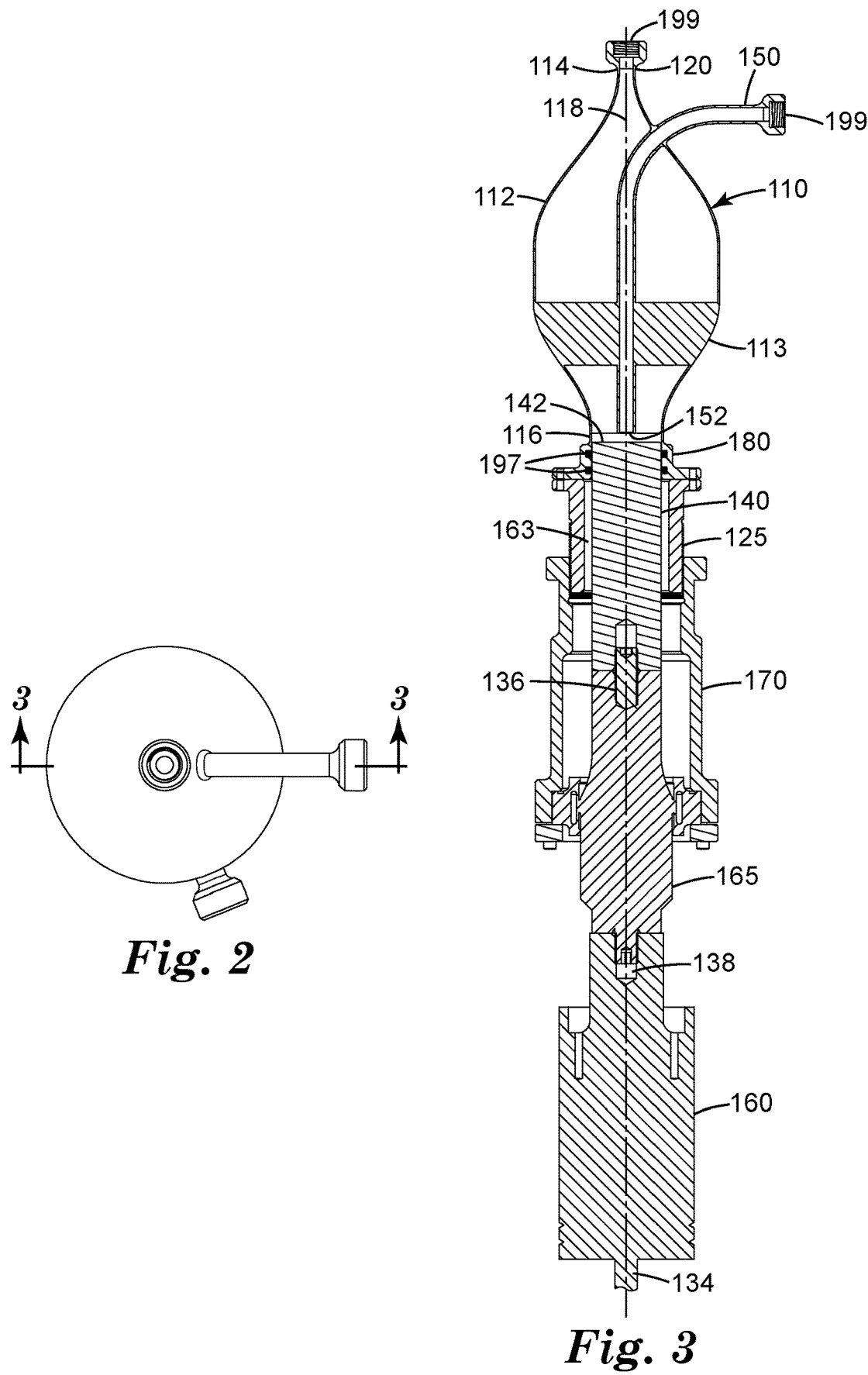
FIG. 2 is a schematic top view of a powder deagglomerator 100.
FIG. 3 is a schematic cross-sectional side view of powder deagglomerator 100 in FIG. 1 taken along line 3-3.
Figure 4:
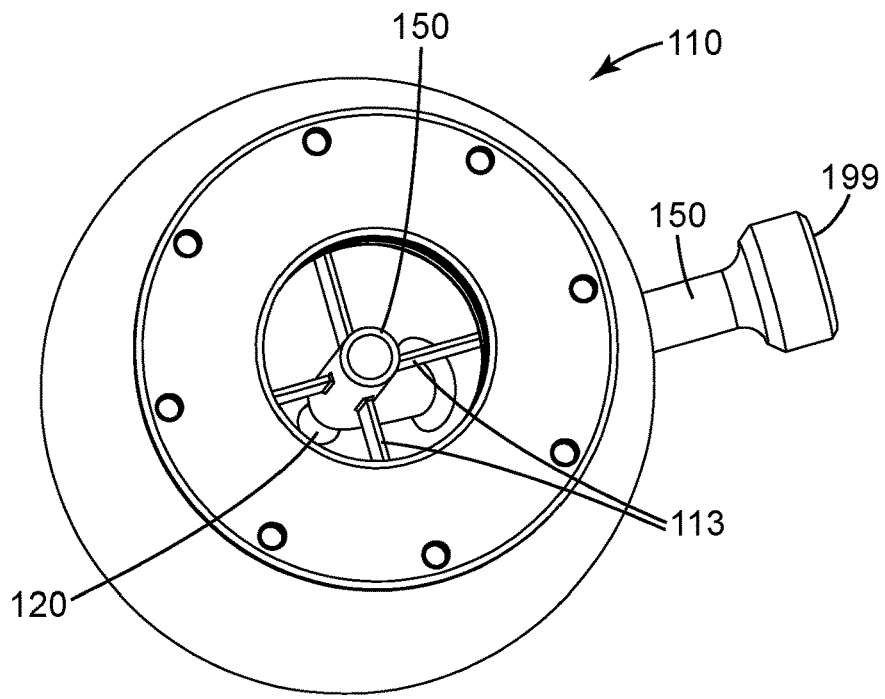
FIG. 4 is a schematic bottom view of vertical flow chamber 110 and associated powder inlet tube 150.
Figure 5A:
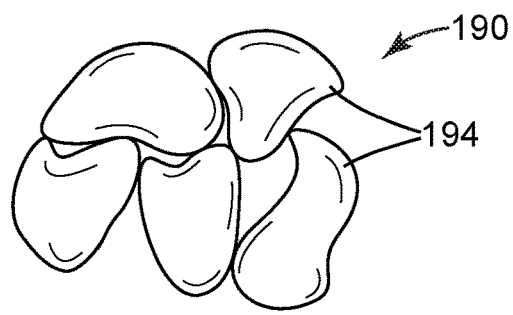
FIG. 5A is a schematic side view of an agglomerated powder 190 according to the present disclosure.
Figure 5B:
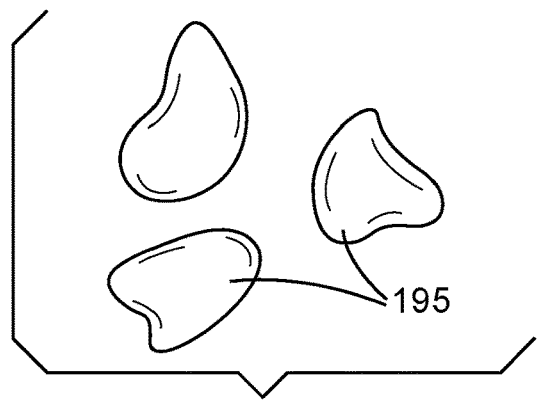
FIG. 5B is a schematic side view of unagglomerated constituent particles 195 according to the present disclosure.
Figure 6:
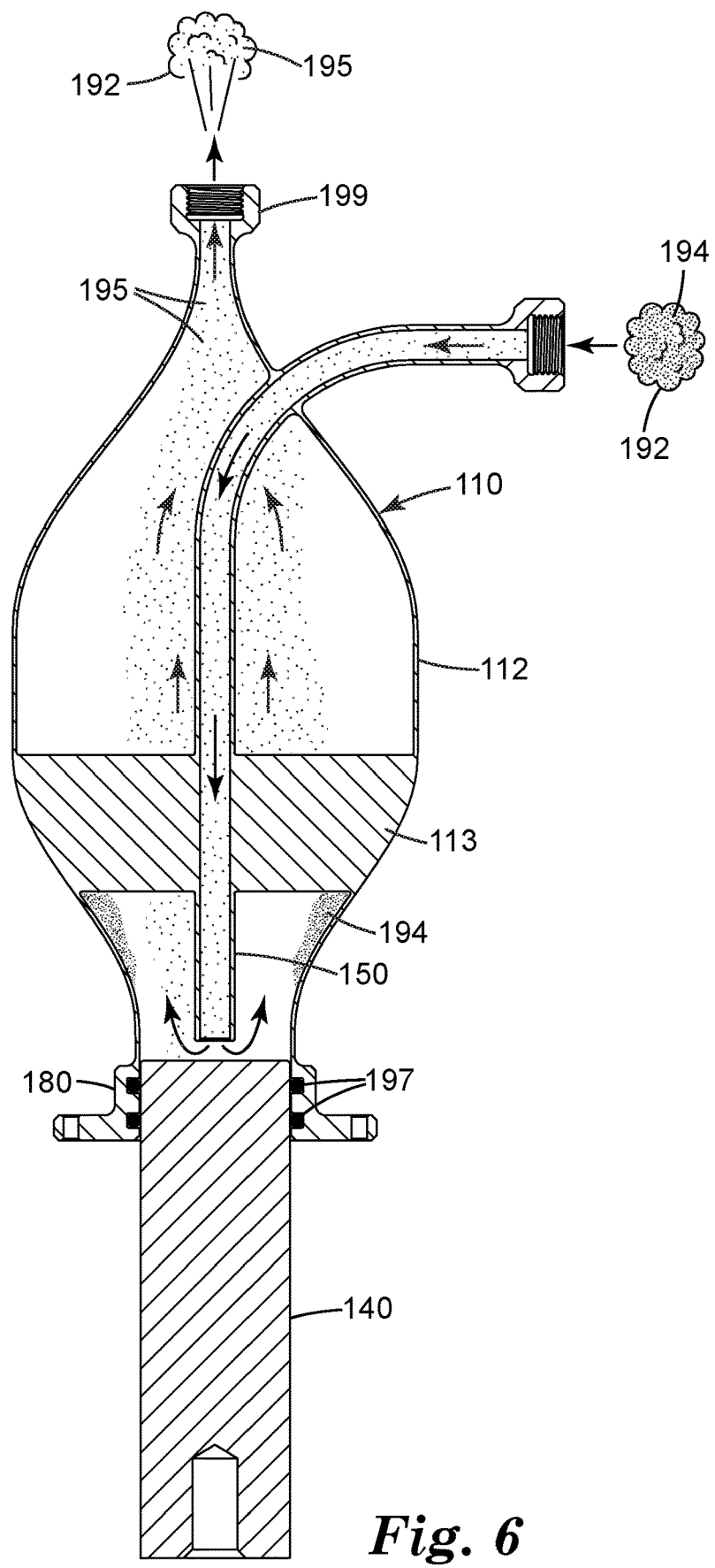
FIG. 6 is a schematic process flow diagram illustrating powder deagglomerator 100 in operation.

While vertical flow chamber is shown as being symmetrically rotatable around the longitudinal axis (e.g., as shown in FIG. 2), this is not a requirement, and other configurations are also possible. Likewise, one or both of the ends need not be tapered, although it is preferred. The vertical flow chamber need not be perfectly vertically oriented, but it is preferably with 20 degrees, more preferably with 10 degrees, and even more preferably with 5 degrees of vertical in order that, on a rotational basis around the longitudinal axis, an even distribution of powder within the vertical flow chamber is achieved.

Sealing members 197 shown as elastomeric O-rings form seals between the tubular mounting member and the ultrasonic horn that aid in vibration damping and retention of the powder within the vertical flow chamber. Likewise, and threaded couplings 199 form seals between inlet tube and powder outlet port with adjacent equipment (e.g., tubing, not shown). O-Rings 197 serve to seal the chamber surrounding the radial face of the horn from the powder chamber. Optional air inlet port 167 permits chamber 163 inside pressure housing 125 to be slightly pressurized relative to the vertical flow chamber, if desired, to further reduce leakage of powder past the sealing members.

The various parts of powder deagglomerator 100 are fastened together using screws 130, threaded boss 138, and set screw 136.

The powder deagglomerator shown in FIGS. 1-4 is shown in operation in FIG. 6. Agglomerated powder (190) comprising agglomerated constituent particles 194 entrained in gaseous stream 192 (see FIGS. 5A and 5B) is introduced through powder inlet tube 150 downward onto distal end 142 of ultrasonic horn 140. Vibrational energy from the horn causes the agglomerated constituent particles to separate and preferentially rise within the vertical flow chamber, with the gaseous stream flow carrying the particles toward the powder outlet port, while gravity tends to keep the larger agglomerated particles in the vicinity of the ultrasonic horn until they are eventually deagglomerated.

Preferably, the gaseous stream flow is adjusted such that at least 20, at least 30, at least 40, at least 50, at least 60, at least 70, at least 80, at least 90, or even at least 95 percent of the agglomerated particles are deagglomerated during one pass through the powder deagglomerator, although this is not requirement. The flow will necessarily depend upon the average constituent particle diameter and the size of the powder deagglomerator. For any given size of powder deagglomerator, lower gaseous stream flow is generally used with smaller average particle diameters, and conversely higher gaseous stream flow is generally used with larger average particle diameters.

Suitable powders include powders comprising graphite, clays, hexagonal boron nitride, pigments, inorganic oxides (e.g., alumina, calcia, silica, ceria, zinc oxide, or titania), metal(s), organic polymeric particles (e.g., polytetrafluoroethylene, polyvinylidene difluoride), dry biological powders (e.g., spores, bacteria). Preferably, unagglomerated constituent particles prepared according to the present disclosure are used promptly after deagglomeration in order to prevent reagglomeration.

Preferably, the constituent particles have an average particle size of 0.1 to 100 microns, more preferably 1 to 50 microns, and more preferably 1 to 25 microns, although this is not a requirement. To ensure that the powder particles contact the ultrasonic horn, the gap between the powder inlet tube and the distal end of the ultrasonic horn face is preferably set at a gap of 30 to 250 mils (0.76 to 6.35 mm), although this is not a requirement. One skilled in the art can observe that the gap is many time greater than the particle and agglomerate size and thereby doesn't serve as a physical barrier to the flow of the powder.

The vertical flow chamber, tubing, and associated components can be made of any suitable material such as, for example, metal, thermoplastic, and/or cured polymeric resin. In preferred embodiments, the vertical flow chamber is fabricated by 3D printing.

Powder deagglomerators according to the present disclosure can be used in powder coating applications including but not limited to painting, powder dispersion, and the coating of woven and non-woven articles.

Select Embodiments of the Present Disclosure

In a first embodiment, the present disclosure provides a powder deagglomerator (100) comprising:

a vertical flow chamber (110) having a longitudinal axis (118) and comprising:

an outer wall (112);

a powder outlet port (120) disposed at an upper end (114) of the vertical flow chamber (110);

a mounting port (180) sealably engaging an ultrasonic horn (140) disposed at a lower end (116) of the vertical flow chamber (110) opposite the upper end (114); and a powder inlet tube (150), optionally extending through the outer wall (112), aligned to dispense agglomerated powder (190) in a gaseous stream downward onto a distal end (142) of the ultrasonic horn (140);

an ultrasonic transducer (160) vibrationally coupled to the ultrasonic horn (140).

In a second embodiment, the present disclosure provides a powder deagglomerator (100) according to the first embodiment, further comprising a pressure housing (125) secured to the mounting port (180) such that the ultrasonic horn (140) extends within the pressure housing (125).

In a third embodiment, the present disclosure provides a powder deagglomerator (100) according to the first or second embodiment, wherein one end of the powder inlet tube (150) is disposed along the longitudinal axis (118) of the vertical flow chamber (110).

In a fourth embodiment, the present disclosure provides a powder deagglomerator (100) according to any one of the first to third embodiments, wherein the upper and lower ends (114,116) of the vertical flow chamber (110) are inwardly tapered toward the longitudinal axis (118).

In a fifth embodiment, the present disclosure provides a powder deagglomerator (100) according to any one of the first to fourth embodiments, wherein the ultrasonic horn (140) has a distal end (142) vertically disposed within the vertical flow chamber (110).

In a sixth embodiment, the present disclosure provides a method of deagglomerating a powder comprising agglomerated particles, the method comprising:
providing a powder deagglomerator (100) comprising:
a vertical flow chamber (110) having a longitudinal axis (118) and comprising:
an outer wall (112);
a powder outlet port (120) disposed at an upper end (114) of the vertical flow chamber (110);
a mounting port (180) sealably engaging an ultrasonic horn (140) disposed at a lower end (116) of the vertical flow chamber (110) opposite the upper end (114);
a powder inlet tube (150) extending through the outer wall (112) and aligned to supply an agglomerated powder (190) comprising agglomerated constituent particles (not shown) entrained in a gaseous stream (192) downward onto a distal end (142) of the ultrasonic horn (140); and
an ultrasonic transducer (160) vibrationally coupled to the ultrasonic horn (140); and
introducing the agglomerated powder (190) entrained in the gaseous stream (192) into the powder inlet tube (150) such that at least some of the agglomerated constituent particles (194) contact the ultrasonic horn (140) and are deagglomerated to provide unagglomerated constituent particles (195), whereby at least some of the unagglomerated constituent particles (195) are entrained in the gaseous stream (192) at the powder outlet port (120).

In a seventh embodiment, the present disclosure provides a method according to the sixth embodiment, wherein the powder deagglomerator (100) further comprises a pressure housing (125) secured to the mounting port (180) such that the ultrasonic horn (140) extends within the pressure housing (125).

In an eighth embodiment, the present disclosure provides a method according to the sixth or seventh embodiment, wherein one end of the powder inlet tube (150) is disposed along the longitudinal axis (118) of the vertical flow chamber (110).

In a ninth embodiment, the present disclosure provides a method according to any one of the sixth to eighth embodiments, wherein the upper and lower ends (114,116) of the vertical flow chamber (110) are inwardly tapered toward the longitudinal axis (118).

In a tenth embodiment, the present disclosure provides a method according to any one of the sixth to ninth embodiments, wherein the ultrasonic horn (140) has a distal end (142) vertically disposed within the vertical flow chamber (110).

In an eleventh embodiment, the present disclosure provides a method according to any one of the sixth to tenth embodiments, wherein the agglomerated constituent particles (194) comprise agglomerated graphite particles.

In a twelfth embodiment, the present disclosure provides a method according to any one of the sixth to eleventh embodiments, wherein the unagglomerated constituent particles (195) have an average particle size of 0.1 to 100 microns.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

A powder deagglomerator was constructed to scale as shown in FIGS. 1-4, where the gap between the powder inlet tube and the distal end of the ultrasonic horn face was set at 3.2 mm. The diameter of the vertical flow chamber was 4.0 inches (10.2 cm). The ultrasonic horn was operated at a frequency of 20 kHz and a power of 200 W. A vacuum dust collector was attached to the powder outlet port. Graphite powder (particle size=3-7 microns) was introduced into the powder inlet tube entrained in an air stream flow of 0.3 cfm (8.5 L/min).

During operation, in addition to fine particles that exited the powder outlet port, agglomerated particles accumulated on the outer walls of the vertical flow chamber. Once the local accumulation reached an amount unable to be supported by the weak attraction to the wall, the agglomerate would fall and land on the horn face. The powder buildup was thus gradual and self-limiting.

For example, during one test, the inlet powder flow was terminated yet continuous powder flow from the powder outlet port was observed for nearly a minute.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A powder deagglomerator comprising:
a vertical flow chamber having a longitudinal axis and comprising:
an outer wall;
a powder outlet port disposed at an upper end of the vertical flow chamber;
a mounting port sealably engaging an ultrasonic horn disposed at a lower end of the vertical flow chamber opposite the upper end;
a powder inlet tube aligned to dispense agglomerated powder in a gaseous stream downward onto a distal end of the ultrasonic horn, wherein the powder inlet tube has an end disposed along the longitudinal axis, and wherein a gap between the powder inlet tube and the distal end of the ultrasonic horn face is set at a gap of 0.76 to 6.35 millimeters; and
an ultrasonic transducer vibrationally coupled to the ultrasonic horn.

2. The powder deagglomerator of claim 1, further comprising a pressure housing secured to the mounting port such that the ultrasonic horn extends within the pressure housing.

3. The powder deagglomerator of claim 1, wherein the upper and lower ends of the vertical flow chamber are inwardly tapered toward the longitudinal axis.

4. The powder deagglomerator of claim 1, wherein the ultrasonic horn has a cylindrical distal end vertically disposed within the vertical flow chamber.

5. A method of deagglomerating a powder comprising agglomerated particles, the method comprising:

providing a powder deagglomerator comprising:

a vertical flow chamber having a longitudinal axis and comprising:

an outer wall;

a powder outlet port disposed at an upper end of the vertical flow chamber;

a mounting port sealably engaging an ultrasonic horn disposed at a lower end of the vertical flow chamber opposite the upper end;

a powder inlet tube aligned to supply an agglomerated powder comprising agglomerated constituent particles entrained in a gaseous stream downward onto a distal end of the ultrasonic horn, wherein the powder inlet tube has an end disposed along the longitudinal axis, and wherein a gap between the powder inlet tube and the distal end of the ultrasonic horn face is set at a gap of 0.76 to 6.35 millimeters; and an ultrasonic transducer vibrationally coupled to the ultrasonic horn; and introducing the agglomerated powder entrained in the gaseous stream into the powder inlet tube such that at least some of the agglomerated constituent particles contact the ultrasonic horn and are deagglomerated to provide unagglomerated constituent particles, whereby at least some of the unagglomerated constituent particles are entrained in the gaseous stream at the powder outlet port.

6. The method of claim 5, wherein the powder deagglomerator further comprises a pressure housing secured to the mounting port such that the ultrasonic horn extends within the pressure housing.

7. The method of claim 5, wherein the upper and lower ends of the vertical flow chamber are inwardly tapered toward the longitudinal axis.

8. The method of claim 5, wherein the ultrasonic horn has a cylindrical distal end vertically disposed within the vertical flow chamber.

9. The method of claim 5, wherein the agglomerated constituent particles comprise agglomerated graphite particles.

10. The method of claim 5, wherein the unagglomerated constituent particles have an average particle size of 0.1 to 100 microns.

* * * * *